US006324173B1

(12) United States Patent
Deschaine et al.

(10) Patent No.: US 6,324,173 B1
(45) Date of Patent: Nov. 27, 2001

(54) SYSTEM AND METHOD FOR ROUTING INTERNET CALLS

(75) Inventors: Stephen A. Deschaine, Garland; Edward P. Traupman, Fairview; Ronald L. Ward; Kevin W. Hager, both of Flower Mound, all of TX (US)

(73) Assignee: Alcatel USA Sourcing, L.P., Plano, TX (US)

( * ) Notice: Subject to any disclaimer, the term of this patent is extended or adjusted under 35 U.S.C. 154(b) by 0 days.

(21) Appl. No.: 08/850,500

(22) Filed: May 2, 1997

(51) Int. Cl.[7] .................................................. H04L 12/66
(52) U.S. Cl. ............................................ 370/352; 370/401
(58) Field of Search ............................... 370/351, 352, 370/357, 360, 389, 392, 401, 485, 259, 353, 354, 355, 356; 379/88, 89, 201, 220, 233, 230, 207, 905, 908

(56) References Cited

U.S. PATENT DOCUMENTS

| 5,193,110 | * | 3/1993 | Jones et al. | 379/94 |
| 5,608,446 | * | 3/1997 | Carr et al. | 348/6 |
| 5,610,910 | * | 3/1997 | Focsaneanu et al. | 370/351 |
| 5,812,639 | * | 9/1998 | Bartholomew et al. | 379/89 |
| 5,835,583 | * | 11/1998 | Hetz et al. | 379/220 |
| 6,069,890 | * | 5/2000 | White et al. | 370/352 |

FOREIGN PATENT DOCUMENTS 9620553    7/1996  (WO) ............................ H04M/3/50

OTHER PUBLICATIONS

P. Carbone, et al., "Internet Thruway: A Profitable New Route for Data Traffic", Telesis, No. 102, Dec. 1996, pp. 6–15.

* cited by examiner

Primary Examiner—Valencia Martin-Wallace
Assistant Examiner—Kim T. Nguyen
(74) Attorney, Agent, or Firm—Baker Botts L.L.P.

(57) ABSTRACT

An Internet call routing system (200, 250, 300) includes a master controller (220, 264, 314) coupled to a signaling control network, and a call routing element (205, 260, 280, 310) coupled to the master controller and a voice switched network (206, 256, 306). The call routing element receives calls destined for an information service provider (216, 272, 322) from the voice switched network as directed by the master controller. At least one modem bank (208, 262, 284, 312) is coupled to the call routing element and master controller for converting the calls destined for the information service provider from a first format to a second format and then providing the converted calls to a packet data network. Additionally, the modem interface to the packet data network includes a controller (62) coupled to a master controller (220, 264, 314) for receiving control information therefrom. At least one modem (60) receives a call destined for an information service provider from a call routing element and converts the call from an analog format to a digital format. An adaptation unit (66) is coupled to the at least one modem for packing the digital call into a plurality of data packets. A network interface (68) is coupled to the adaptation unit for transporting the data packets to a packet data network.

14 Claims, 12 Drawing Sheets

SYSTEM AND METHOD FOR ROUTING INTERNET CALLS

RELATED PATENT APPLICATION

This application is related to U.S. patent application Ser. No. 08/777,817, filed on Dec. 31, 1996, which claims the benefit of U.S. Provisional Application No. 60/014,862, filed on Apr. 4, 1996.

TECHNICAL FIELD OF THE INVENTION

The present invention relates in general to telecommunications signal processing and more particularly to a system and method for routing Internet calls.

BACKGROUND OF THE INVENTION

As access demand on the Internet or with on-line services grows, a proportional increase in the stress on telecommunications equipment occurs to support the access demand. Subscribers typically access the Internet through one or more Internet Service Providers. Each Internet Service Provider is generally accessed by subscribers using discrete local telephone numbers that provide broad coverage into a public switched telephone network. Access to the Internet Service Provider is typically a free local call where the local exchange carrier receives no revenues for the telephone usage. Internet Service Providers terminate in end offices of the public switched telephone network using conventional subscriber numbering plans. No control exists as to Internet subscriptions, local telephone number assignments for Internet Service Providers, or locations of Internet Service Providers. Internet traffic between subscribers and Internet Service Providers is mainly routed through the existing public switched telephone network over the same trunks that carry voice, facsimile, and data calls.

Traditional network engineering traffic guidelines do not take into consideration the longer than average hold times of Internet calls. Most telecommunications equipment were designed based on an average call holding time of three to five minutes. However, average call holding times for Internet calls is significantly longer. Current estimates are that Internet and similar services have raised the total average call holding time to over ten minutes. This is expected to increase as the Internet continues to grow. Current end office switches within the public switched telephone network are not configured to support extended access to the Internet. The increased average call holding times of Internet calls place a strain on the public switched telephone network that affects the quality of service provided to and expected by the local subscriber. The public switched telephone network is no longer able to provide effective universal services to its customers while meeting the growing Internet demands.

Increased average call holding times decrease the carrying capacity of trunks and, because the calls are typically free, decrease toll call revenue per trunk as a result of the increased content per call. Though additional trunks may be installed to support the increase in call holding times, such additions increase trunk group costs and operating expenses. Congestion occurs within the public switched telephone network as customers attempt and re-attempt their calls. Service quality suffers resulting in increased customer dissatisfaction and increased service costs. Expensive and complex switch reconfigurations would be needed in order to relieve the congestion on the public switched telephone network caused by Internet calls. Therefore, it is desirable to reduce the congestion in the public switched telephone network caused by the long holding times of Internet calls.

SUMMARY OF THE INVENTION

From the foregoing, it may be appreciated that a need has arisen for a technique of avoiding congestion on a public switched telephone network caused by the long hold times of Internet calls. In accordance with the present invention, a method and apparatus of routing Internet calls are provided that substantially eliminate or reduce disadvantages and problems associated with conventional processing of Internet calls.

In one aspect of the invention, an Internet call routing system includes a master controller coupled to a signaling control network, and a call routing element coupled to the master controller and a voice switched network. The call routing element receives calls destined for an information service provider from the voice switched network as directed by the master controller. At least one modem bank is coupled to the call routing element and master controller for converting the calls destined for the information service provider from a first format to a second format and then providing the converted calls to a packet data network.

In another aspect of the invention, a modem interface to a packet data network includes a controller coupled to a master controller for receiving control information therefrom. At least one modem receives a call destined for an information service provider from a call routing element and converts the call from an analog format to a digital format. An adaptation unit is coupled to the at least one modem for packing the digital call into a plurality of data packets. A network interface is coupled to the adaptation unit for transporting the data packets to a packet data network.

In yet another aspect of the invention, a method for interfacing to a packet data network includes the steps of receiving a call from a call routing element, and receiving control information from a master controller. The call is converted from an analog format to a digital format, and then packed into a plurality of data packets or cells. A destination address is obtained from the control information, and inserted into the plurality of data packets. The plurality of data packets are then sent to an information service provider via a packet data network.

The present invention provides various technical advantages over conventional Internet call processing. For example, one technical advantage is to re-route Internet calls off of the public switched telephone network. Another technical advantage is to avoid burdening the public switched telephone network with the long hold times typical of Internet calls. Yet another technical advantage is to transport Internet calls in asynchronous transfer mode cell format or frame relay format over an asynchronous transfer mode network or a frame relay network to an Internet service provider. Other technical advantages are readily apparent to one skilled in the art from the following figures, descriptions, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
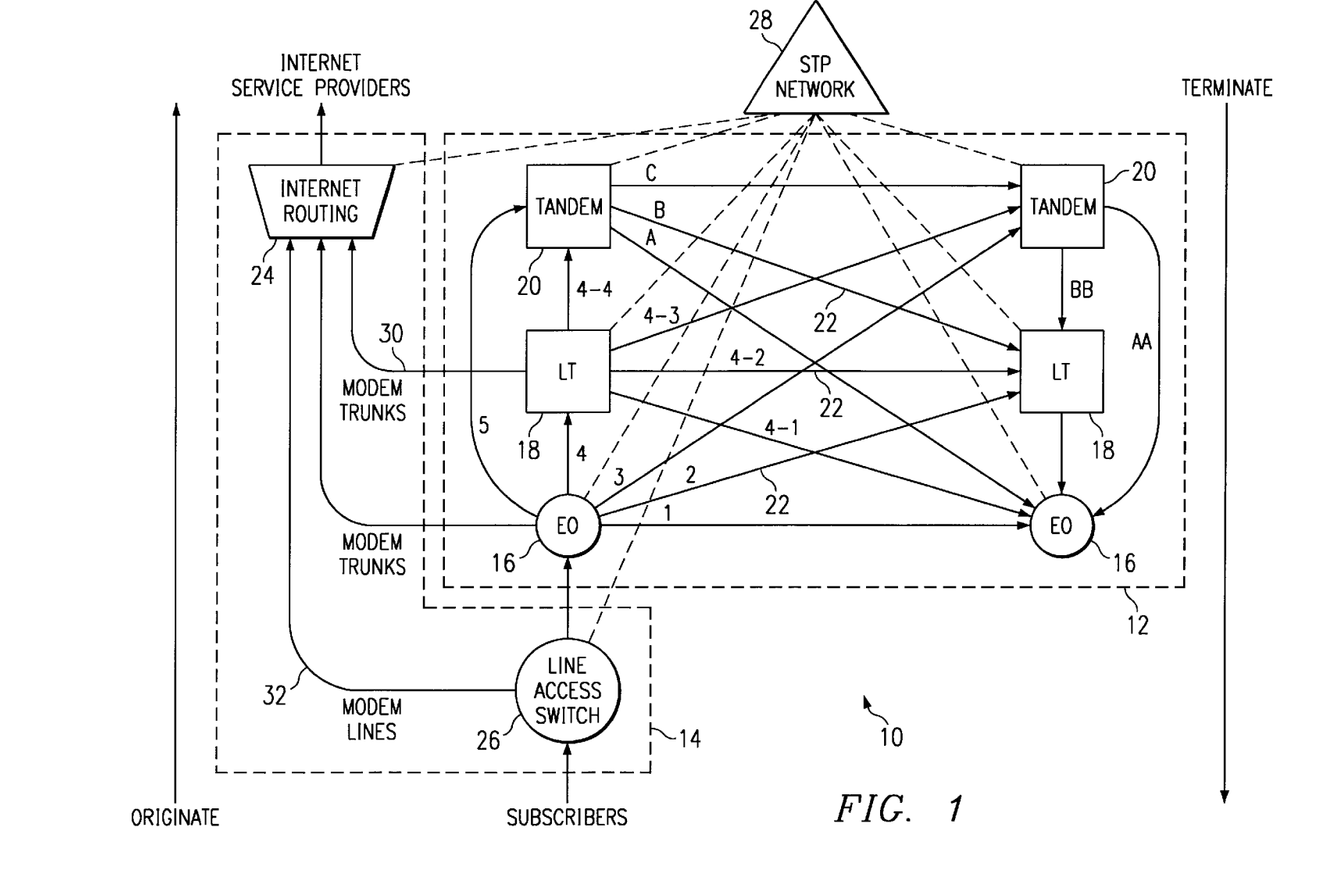
FIG. 1 is a block diagram of a telecommunications switched network.

FIG. 1 is a block diagram of a telecommunications switched network 10. Telecommunications switched network 10 includes a local public switched telephone network 12 and an Internet data network 14. Public switched telephone network 12 includes a plurality of end offices 16, a plurality of local tandem switches 18, and a plurality of tandem switches 20. End offices 16, local tandem switches 18, and tandem switches 20 are interconnected by a plurality of trunks 22 in order to provide adequate means for transporting telecommunications information from an originating subscriber to a destination subscriber in communication with end offices 16. Internet data network 14 includes Internet routing elements 24 that perform switching functions for Internet Calls re-routed from public switched telephone network 12. Internet data network 14 may also include line access switches or digital loop carriers 26 coupled to Internet routing elements 24 and public switched telephone network 12. A signal transfer point network 28 provides control, management, and administrative functions for public switched telephone network 12 and Internet data network 14.

Conventional operation of public switched telephone network 12 provides for routing of Internet calls through the same configuration of trunks 22 used to route voice, facsimile, and data calls. In order to avoid installing additional trunks 22 to relieve trunk congestion within public switched telephone network 12, avoid installing more crosspoints to relieve concentrator congestion within end offices 16, and avoid replacing existing equipment within public switched telephone network 12, all necessary to handle the longer hold times caused by Internet calls, Internet data network 14 provides a means to re-route Internet calls and eliminate the effect Internet calls have on public switched telephone network 12. Internet calls may be re-routed onto modem trunks 30 from either local tandem switches 18 or end offices 16. Internet calls may also be re-routed away from public switched telephone network 12 onto modem lines 32 by line access switches 26.

Figure 2:
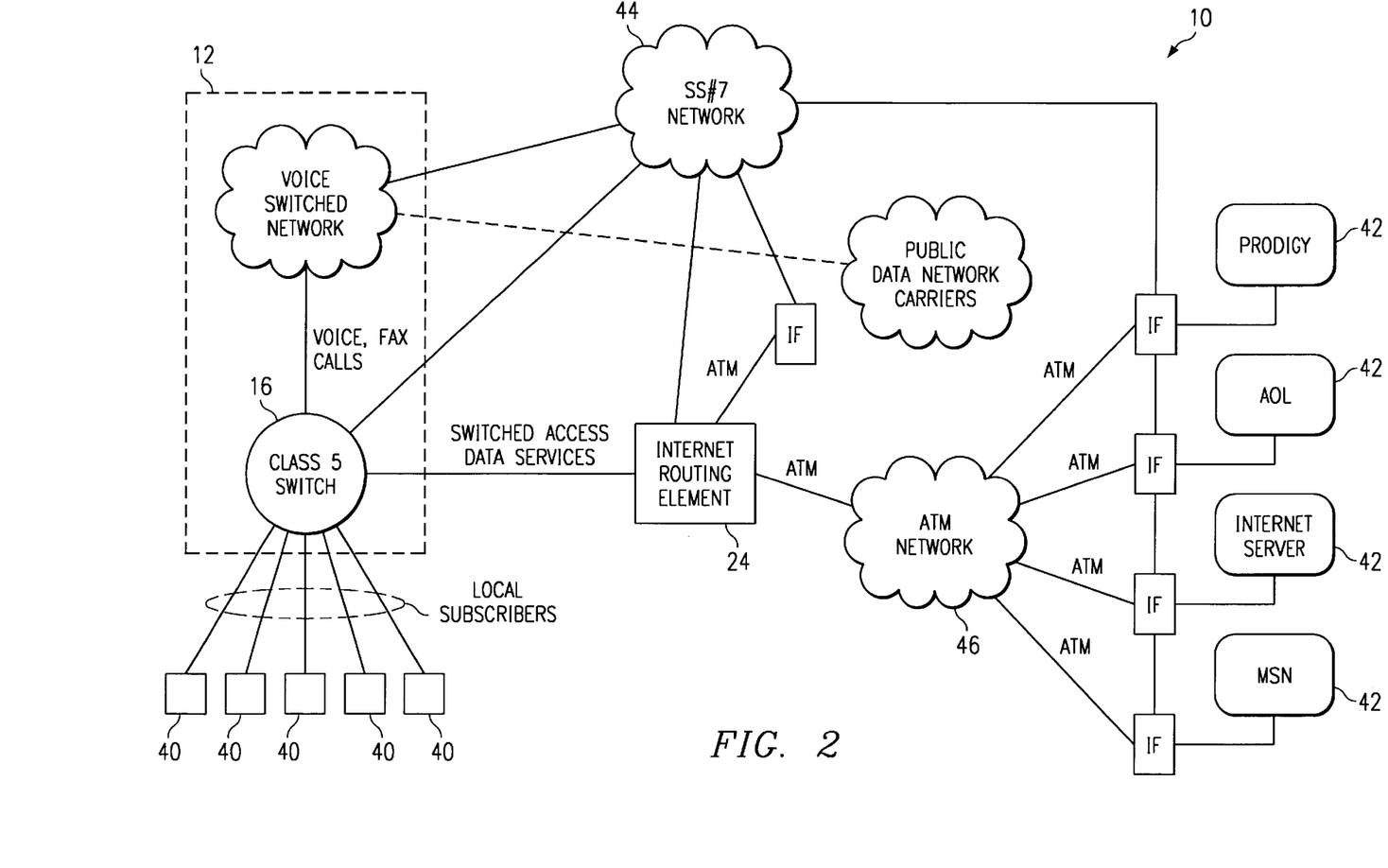
FIG. 2 is a block diagram of an Internet call through the telecommunications switched network.

FIG. 2 shows how an Internet call is transferred from a local subscriber 40 to an Internet Service Provider 42 within telecommunications switched network 10 after entering public switched telephone network 12. For unloading Internet calls from trunks 22 within public switched telephone network 12 to Internet data network 14, signal transfer point network 28 works with local tandem switches 18, end offices 16, and Internet routing elements 24 to assign modem trunks 30 and determine the destination for routing the Internet call based on signaling protocols of an SS7 network 44. Conventional processing and routing is performed within public switched telephone network 12 of Non-Internet calls. Public switched telephone network 12 may also process and route Internet calls in the event of problems occurring within Internet data network 14. End office 16 or local switch 18 accepts the Internet call and routes the Internet call to an appropriate Internet routing element 24. Internet routing element 24 terminates the analog signals received from public switched telephone network 12 and adapts the call into asynchronous transfer mode cell format. The asynchronous transfer mode cells are multiplexed for transmission across a packet data network 46 such as an asynchronous transfer mode (ATM) or frame relay (FR) network to the appropriate Internet service provider 42.

Figure 3:
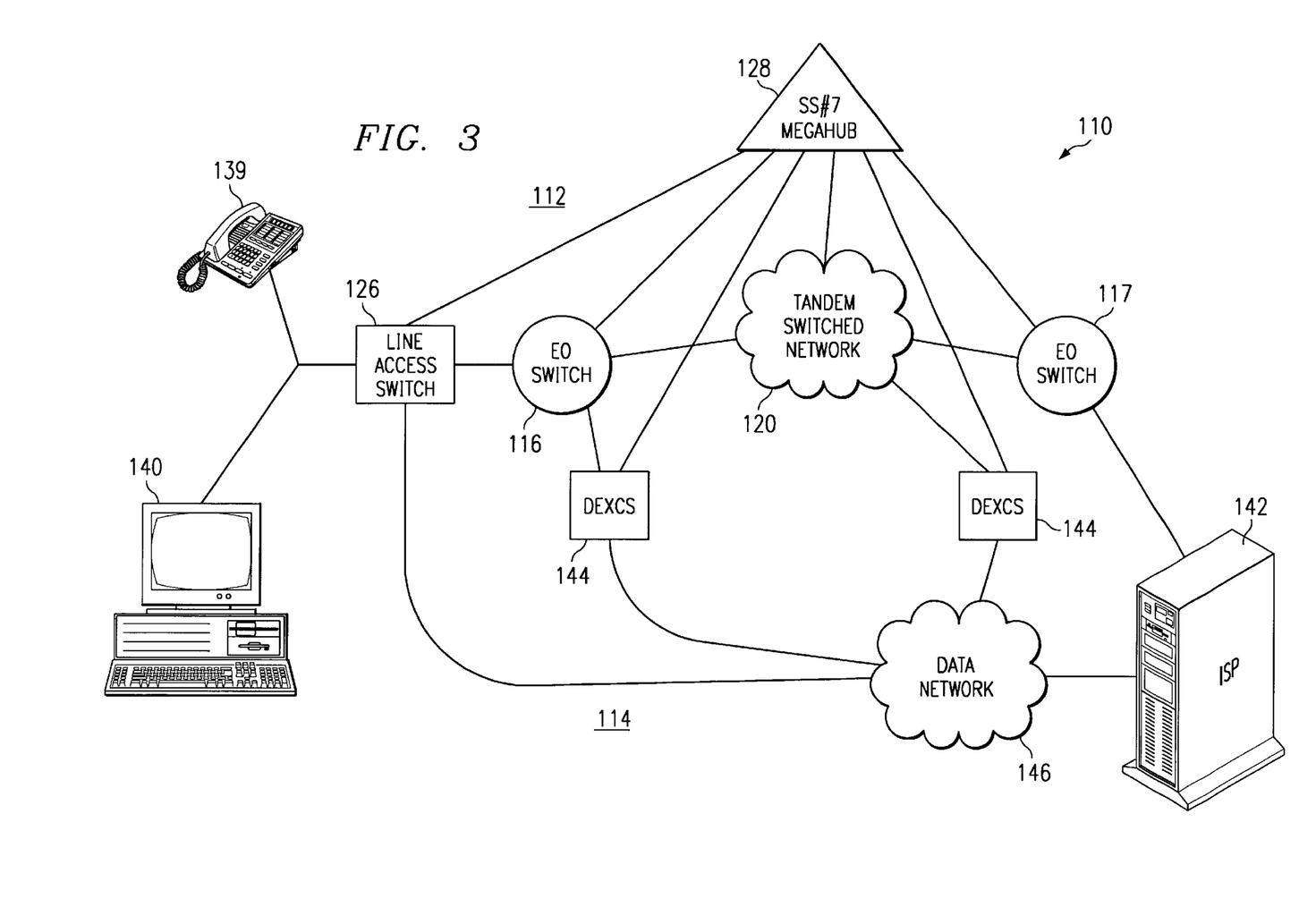
FIG. 3 is another view of the telecommunications switched network.

FIG. 3 is another view of a telecommunications switched network 110 showing potential congestion points due to Internet traffic. Telecommunications switched network 110 is shown separated into a public switched telephone network 112 and Internet data network 114. For conventional operation, calls originating from a telephone subscriber 139 or a computer subscriber 140 and destined for an information service provider 142 are routed through public switched telephone network 112. The term information service provider hereinafter refers to Internet service providers and to enhanced service providers such as America On Line, CompuServ and Prodigy. Public switched telephone network 112 includes local access switch 126, originating end office switch 116, a tandem switch network 120, and terminating end office switch 117, all under the control and supervision of a signal transfer point 128. Since calls destined for information service provider 142 occupy available resources of public switched telephone network 112 due to the long call holding times, such as for Internet access, congestion points occur within public switched telephone network 112. Congestion occurs at the subscriber side at originating end office switch 116, congestion occurs in the trunk network at tandem switch network 120, and congestion occurs at the terminating end at terminating end office switch 117. The congestion on public switched telephone network 112 will exceed engineered switch and network trunking arrangements, resulting in call denial. Data subscribers and voice subscribers may experience no dialtone, slow dialtone, and all trunks busy signals due to the degradation in the network quality.

In order to alleviate the congestion on public switched telephone network 112, calls identified as originating from a subscriber 139 or 140 and destined for an information service provider 142 are redirected from public switched telephone network 112 onto Internet data network 114. Internet data network 114 includes a packet data network 146 that receives line side redirection of data calls from local access switch 126 to alleviate the subscriber side congestion and originating end office switch 116. Packet data network 146 also receives trunk side redirection of calls from originating end office switch 116 through an Internet routing element 124 in order to alleviate trunk network congestion at tandem switch network 120. Packet data network 146 also receives trunk side redirection of data calls from tandem switch network 120 in order to alleviate congestion at terminating end office switch 117 through an Internet routing element 124. Packet data network 146 then appropriately routes data calls to information service provider 142. Identification and redirection of data calls is performed by signal transfer point 128 through an SS7 messaging protocol.

Internet routing elements 124 are used for grooming and transport of data call traffic onto packet data network 146.

In order to relieve subscriber side congestion at originating end office switch 116, a call destined for information service provider 142 is identified in order to successfully divert the data call away from public switch telephone network 112. The identification process is performed by signal transfer point 128. During a normal call processing sequence, line access switch 126 converts the analog POTS signal originating from a subscriber 139 or 140 to a digital DS0 signal and forwards that signal to originating end office switch 116 to begin call processing. Call requests that cannot be locally connected generate an SS7 message that is forwarded to signal transfer point 128. The call is completed when an SS7 message arrives back from signal transfer point 128 with instructions on routing. When signal transfer point 128 determines that the call is being placed to information service provider 142 during its digital analysis process on the called party address, it initiates a coordinating sequences of messages that allows originating end office switch 116 to disconnect the call, and free the matrix and free the trunk resource between line access switch 126 and originating end office switch 116. Signal transfer point 128 directs line access switch 126 to divert the call from originating end office switch 116 trunk resources to another resource, such as a dedicated DS0/DS1 circuit or a modem from internal pool with an ATM connection, that bypasses public switch telephone network 112. Packet data network 146 then cross connects the resources between line access switch 126 and information service provider 142. Line access switch 126 continues to monitor the subscriber drop throughout the call, as would be performed for any call. Upon detecting that the subscriber goes on-hook, line access switch 126 informs originating end office switch 116 so that the subscriber line can be once again made available for incoming and outgoing calls. Line access switch 126 also informs signal transfer point 128 so that the dedicated DS0/DS1 circuit or ATM modem connection can be torn down and made available for other calls. If the line disconnect originates at information service provider 142, signal transfer point 128 notifies originating end office switch 116 and line access switch 126 in order to update their call status. All control information exchanges between signal transfer point 128, line access switch 126, and originating end office switch 116, are accomplished using standard signaling messages (such as Q.931) over standard interfaces.

Though line side redirection alleviates congestion directly at originating end office switch 116 and indirectly at tandem switch network 120 and terminating end office switch 117, trunk side redirection is performed to directly eliminate trunk network congestion at tandem switch network 120 and terminating end office switch 117. Trunk side redirection is performed at originating end office switch 116 to adjust congestion at tandem switch network 120 and trunk side redirection is also performed at tandem switch network 120 to address congestion at terminating end office 117.

In order to successfully divert data calls from the trunk network of public switched telephone network 112, signal transfer point 128 identifies calls originating from subscriber 16 or 18 and destined for information service provider 142. During a normal call processing sequence, originating end office switch 116 detects an off-hook condition at subscriber 16 or 18 and generates an SS7 message that is forwarded to signal transfer point 128 for call requests that cannot be locally connected. The call is completed when an SS7 message is returned from signal transfer point 128 with instructions on routing. The call is ended when originating end office switch 116 detects the calling end going on-hook and thus terminates the call. When signal transfer point 128 determines that the call is being placed to information service provider 142, it directs originating end office switch 116 to divert the call to Internet routing element 124. Internet routing element 124 places the call on a resource, such as a dedicated DS0/DS1 circuit or a modem from an internal pool with an ATM connection, that bypasses public switched telephone network 112. Packet data network 146 connects the resource between originating end office switch 116 and information service provider 142. Originating end office switch 116 continues to monitor the subscriber drop throughout the call. Once it detects that a subscriber has gone on-hook, originating end office switch 116 signals signal transfer point 128 through the SS7 network so that the call's connection can be torn down and the resources made available for other calls. If the disconnect originates at information service provider 142, signal transfer point 128 detects the condition and notifies originating end office switch 116 so that it can update its call status.

Signal transfer point 128 works similarly with tandem switch network 120 to redirect data calls from public switched network 112 onto Internet data network 114 in order to alleviate congestion at terminating end office switch 117.

Signal transfer point 128 determines where an Internet call is to be redirected by maintaining a call detail record of calls through telecommunications switched network 110. For example, subscribers identified as heavy Internet subscribers by signal transfer point 128 may be line side redirected at line access switch 126 so that they are removed from public switched telephone network 112 at an earliest possible point in order to avoid congestion. Those subscribers identified as normal Internet subscribers by signal transfer point 128 may be redirected off of public switched telephone network 112 at the trunk side of originating end office switch 116. Those subscribers identifies as low density Internet subscribers by signal transfer point 128 may traverse through public switched telephone network 112 with redirection not occurring until somewhere within tandem switch network 120. In this manner, intelligent rerouting of data calls can occur to avoid congestion and provide smooth call routing within public switched telephone network 112.

Signal transfer point 128 may attempt to redirect the Internet call away from public switched telephone network 112 at any and all of the redirection points discussed above. If a designated route to Internet data network 114 is busy or not available, the Internet call overflows for routing back through public switched telephone network 112. Once the Internet call overflows back to public switched telephone network 112, the Internet call may be routed through alternate paths to Internet data network 114 in higher level offices, once again achieving the goal of removing Internet traffic from the public switched telephone network 112. The Internet call traverses through the entire public switched telephone network 112 only as a last resort in the event there are no other resources available to redirect the Internet call onto Internet data network 114.

Figure 4A:
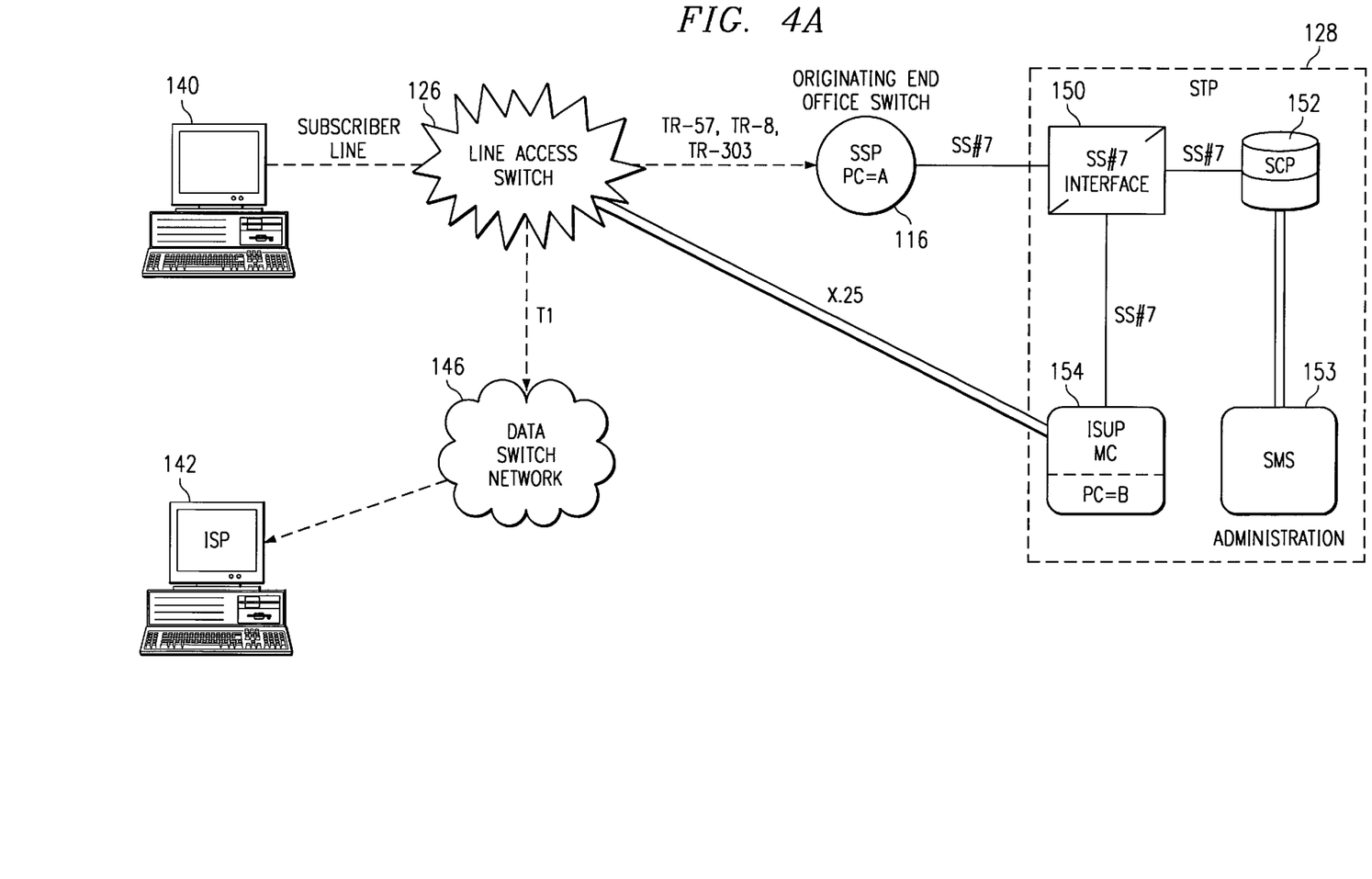
FIGS. 4A–C illustrate call control procedures at different congestion points within the telecommunications switched network.
Figure 4B:
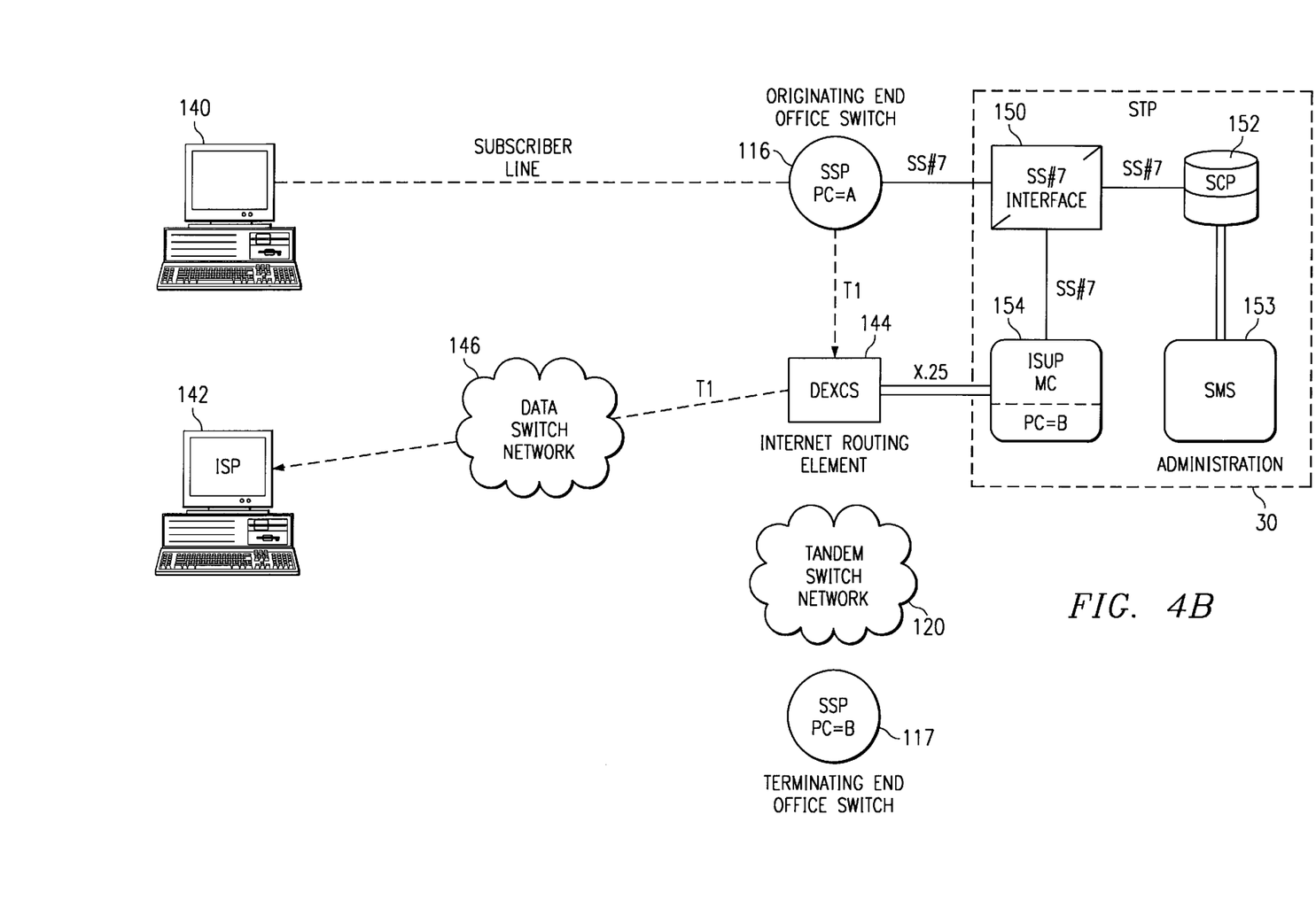
Figure 4C:
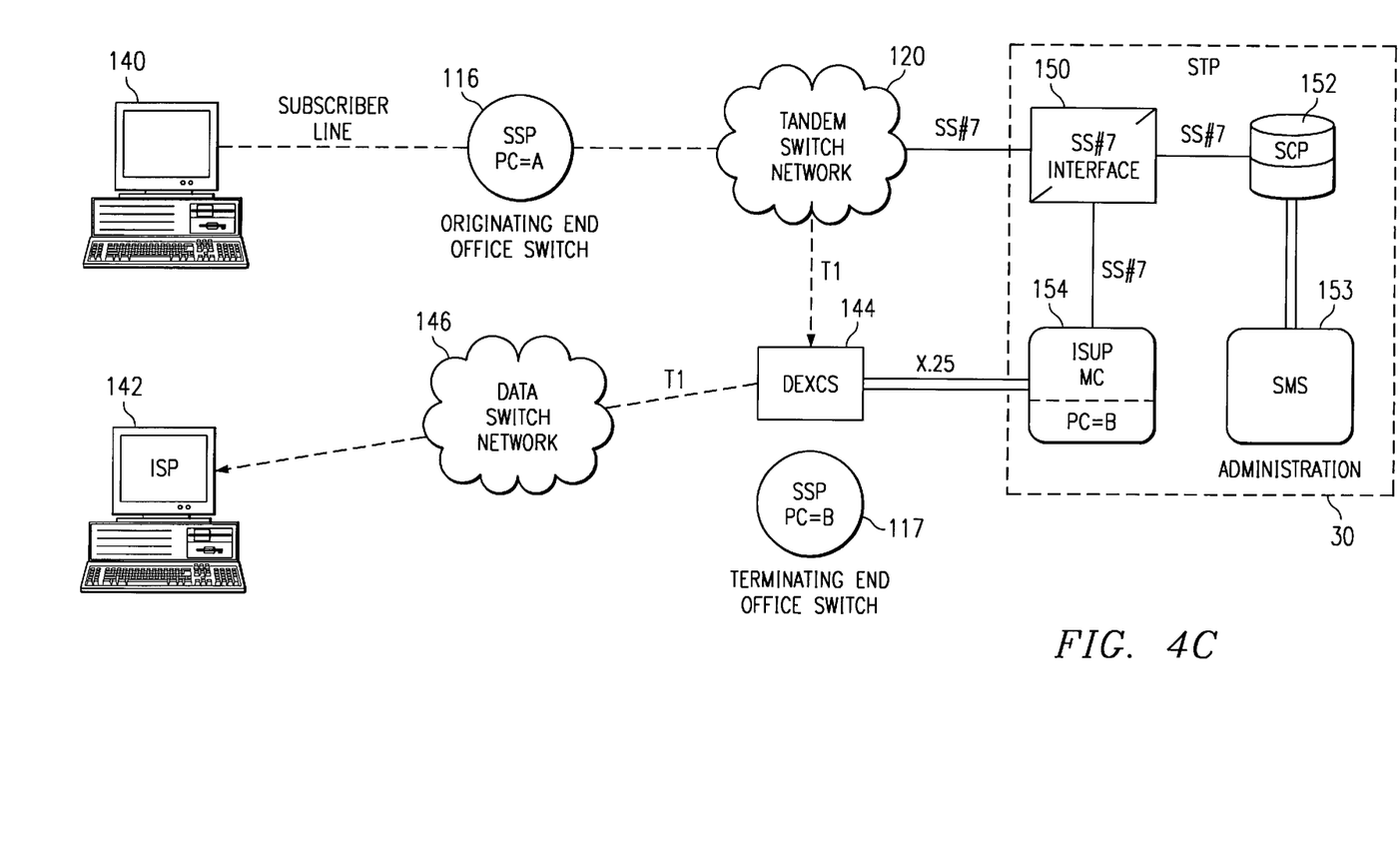

FIGS. 4A through 4C show the call control for redirecting Internet calls off of public switched telephone network 112. FIG. 4A shows the redirection of a line side Internet call at line access switch 126. An Internet call originates from subscriber 140 and proceeds through line access switch 126 to originating end office switch 116. Originating end office switch 116 provides a dial tone for subscriber 140 and collects the digits entered by subscriber 140. Originating end office switch 116 queries signal transfer point 128 through SS7 signaling. Signal transfer point 128 receives the SS7 message at an SS7 interface 150 and performs a lookup of routing instructions within a signal control point 152 in conjunction with an administration unit 153. Signal control point 152 returns a translated called number to originating office switch 116 through SS7 interface 150. Originating end office switch 116 routes the call based on the translated called number response. Originating end office switch 116 sets up an ISUP call between line access switch 126 and a master controller 154 of signal transfer point 128. Master controller 154 passes control and routing information for information service provider 142 to line access switch 126. Line access switch 126 provides an interface to packet data network 146 and routes the Internet call through packet data network 146 to information service provider 142. Line access switch 126 issues a subscriber busy signal to originating end office switch 116 to indicate that subscriber 18 is off hook.

FIG. 4B shows redirection of a trunk side Internet call at originating end office switch 116. An Internet call originates from subscriber 140 to originating end office switch 116. Originating end office switch 116 provides dial tone and collects digits entered by subscriber 140. In response to the digits collected, originating end office switch 116 queries signal transfer point 128 through an SS7 messaging protocol. Signal transfer point 128 receives the SS7 message at SS7 interface 150 and obtains routing instructions from signal control point 152 in conjunction with administration unit 153. Signal control point 152 returns a translated called number to originating end office switch 116 through SS7 interface 150. Originating end office switch 116 sets up the route for the Internet call based on this response. Originating end office switch 116 sets up an ISUP call between master controller 154 of signal transfer point 128 and an Internet routing element 144. Master controller 154 passes control information to Internet routing element 144. Internet routing element 144 establishes the connection for the Internet call onto packet data network 146 and provides the interface with packet data network 146.

FIG. 4C shows redirection of a trunk side Internet call at tandem switch network 120. Subscriber 140 originates an Internet call through originating end office switch 116 and to tandem switch network 120. Tandem switch network 120 queries signal transfer point 128 through the SS7 messaging protocol. The SS7 message received at SS7 interface 150 and routing instructions are obtained from signal control point 152. Signal control point 152 returns a translated called number to tandem switch network 120 through SS7 interface 150. Tandem switch network 120 sets up an ISUP call between its associated Internet routing element 144 and master controller 154 of signal transfer point 128. Master controller 154 obtains routing information for information service provider 142 from signal control point 152, in conjunction with administration unit 153, and passes control and connection information to Internet routing element 144. Internet routing element 144 establishes the connection and provides the interface with packet data network 146. The Internet call is then appropriately redirected through packet data network 146 to information service provider 142.

Figure 5:
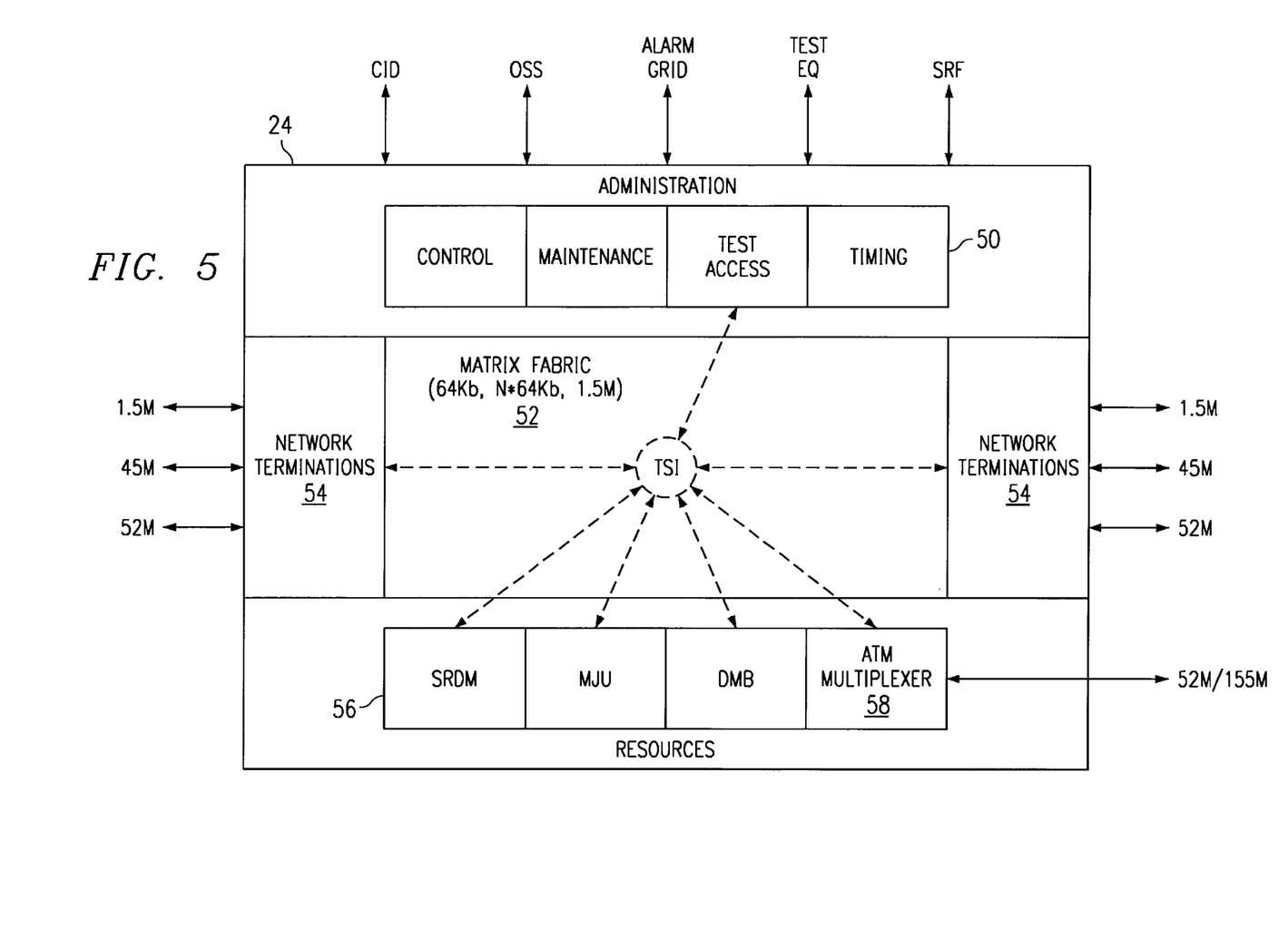
FIG. 5 is a block diagram of an Internet routing element within the telecommunications network.

FIG. 5 is a block diagram of an Internet routing element 24. Internet routing element 24 includes an administration subsystem 50, a matrix fabric subsystem 52, network terminators 54, and a resource subsystem 56. Administration subsystem 50 provides control, maintenance, test access, and timing functions for Internet routing element 24. Network terminators 54 provide the signal interfaces to and from telecommunications switched network 10. Matrix fabric subsystem 52 provides the switching and cross-connect functions for Internet routing element 24. Resource subsystem 56 provides subrate data multiplexing, multi-point junction, digital matrix bridge, and ATM multiplexing functions. Routing and transportation of Internet calls is performed through ATM multiplexer 58.

Figure 6:
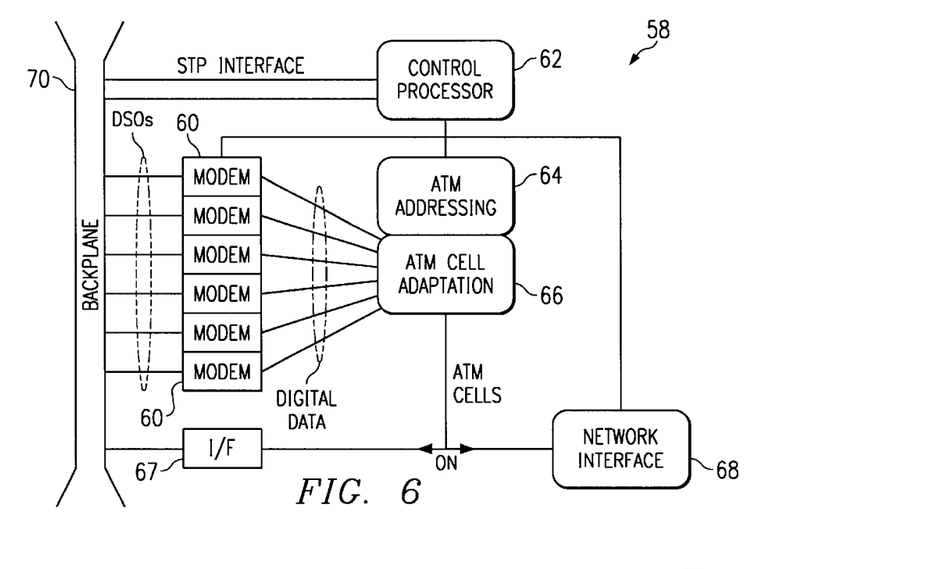
FIG. 6 is a block diagram of an asynchronous transfer mode multiplexer of the Internet routing element.

FIG. 6 is a block diagram of ATM multiplexer 58. ATM multiplexer 58 includes a pool of modems 60, a control processor 62, an ATM addressing unit 64, an ATM cell adaptation unit 66, a backplane interface 67, and a network interface 68. In operation, an Internet call is routed to ATM multiplexer 58 over a backplane 70 of Internet routing element 24. The Internet call is processed by the appropriately assigned modem 60 in order to convert from analog format into digital format. The digital data generated by modem 60 is converted into ATM cells by ATM cell adaptation unit 66. Addressing information is placed into the ATM cells by ATM addressing unit 64 in response to the determination of the destination by control processor 62. Control processor 62 communicates with signal transfer point network 28 to obtain the destination information from the signaling protocols of SS7 network 44. Once the ATM cells have been generated and contain the appropriate addressing information, the ATM cells are transported to and from ATM network 46 by network interface 68 or by backplane interface 67 through network terminators 54.

It may be seen from the foregoing that all references to ATM above may be similarly applicable to other protocols such as frame relay. Instead of ATM cells, ATM cell adaptation 66 shown in FIG. 6 would convert the digital data from modems 60 into frame relay packets, and ATM addressing unit 64 would insert the destination address in the proper location in the packet according to the frame relay protocol.

Figure 7:
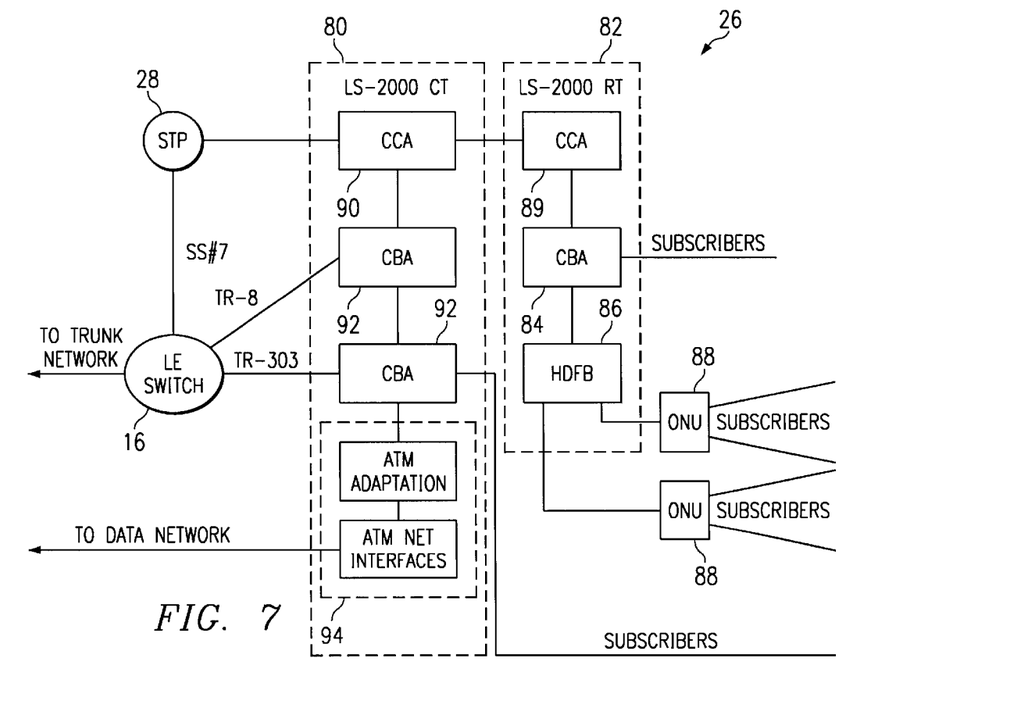
FIG. 7 is a block diagram of a line access switch within the telecommunications network.

FIG. 7 is a block diagram of a line access switch 26 to re-route Internet calls prior to entering public switched telephone network 12. Line access switch 26 includes a digital loop carrier central terminal 80 and a digital loop carrier remote terminal 82. Remote terminal 82 includes a channel bank assembly 84 to service wire line subscribers. Remote terminal 82 also includes a fiber bank assembly 86 to provide fiber optic connection services to subscribers through optical network units 88. A common control assembly 89 provides control and interface functions with central terminal 80 for channel bank assembly 84 and fiber bank assembly 86. Central terminal 80 includes a common control assembly 90 to provide control and interface functions with signal transfer point network 28 and remote terminal 82. Common control assembly 90 also interfaces with channel bank assemblies 92 and ATM multiplexer 94. Channel bank assemblies 92 provide communication to and from end office switch 16 of public switched telephone network 12. ATM multiplexer 94 provides the access for Internet calls to Interface routing element 24 and has a similar structure to that of ATM interface 58.

Figure 8:
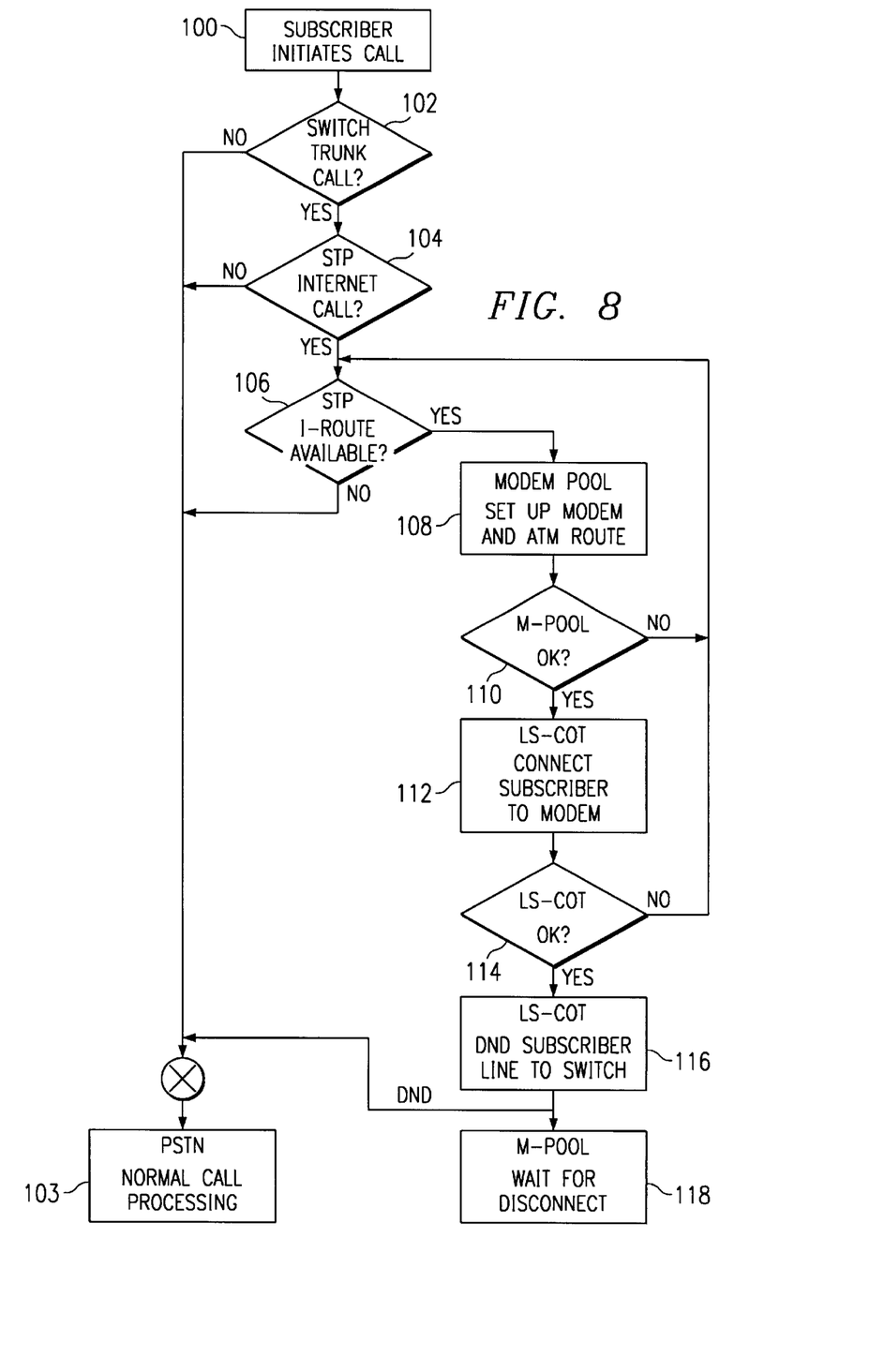
FIG. 8 is a process flow for processing a call through the line access switch.

FIG. 8 shows the process flow of calls through line access switch 26. At process step 100, a subscriber initiates a call that is routed through remote terminal 82 and central terminal 80 to end office switch 16. End office switch 16 determines at process step 102 whether the call is a trunk call for public switched telephone network 12. If not, end office switch 16 performs local call processing at process step 103. If the call is a trunk call, signal transfer point network 28 determines at process step 104 whether the call is an Internet call. If not, end office switch 16 performs normal call processing over public switched telephone network 12 at process step 103. If the call is an Internet call, signal transfer point network 28 determines at process step 106 whether an Internet route is available for the Internet call. If not, end office switch 16 performs normal call processing of the Internet call over public switched telephone network 12 at process step 103.

If the subscriber is making an Internet call and an Internet route is available, the pool of modems within ATM multiplexer 94 is appropriately configured and addressing information for the ATM cells is generated at process step 108. ATM multiplexer 94 determines at process step 110 whether the pool of modems was successfully configured to handle the Internet call. If not, then process flow proceeds back to process step 106 to determine if a different Internet route is available to handle the Internet call. If the pool of modems was properly configured to handle the Internet call, central terminal 80 of line access switch 26 connects the subscriber to the appropriate modem at process step 112. Central terminal 80 disconnects the Internet call from end office switch 16 such that the Internet call now will not be processed over public switched telephone network 12.

Central terminal 80 determines at process step 114 whether the subscriber was successfully connected to the appropriate modem. If not, then process flow proceeds back to process step 106 to determine if a different Internet route is available to handle the Internet call. If subscriber to modem connection was successful, ATM multiplexer 94 begins generating and transporting ATM cells to ATM network 46 either directly or through backplane interface 67 and network interface 68 of Internet routing element 24. Central terminal 80 associates a do not disturb service with the subscriber at process step 116 and informs end office switch 16 of this condition. Central terminal 80 monitors the Internet call for disconnection by the subscriber at process step 118 and appropriately terminates the do not disturb service upon completion of the call.

Figure 9:
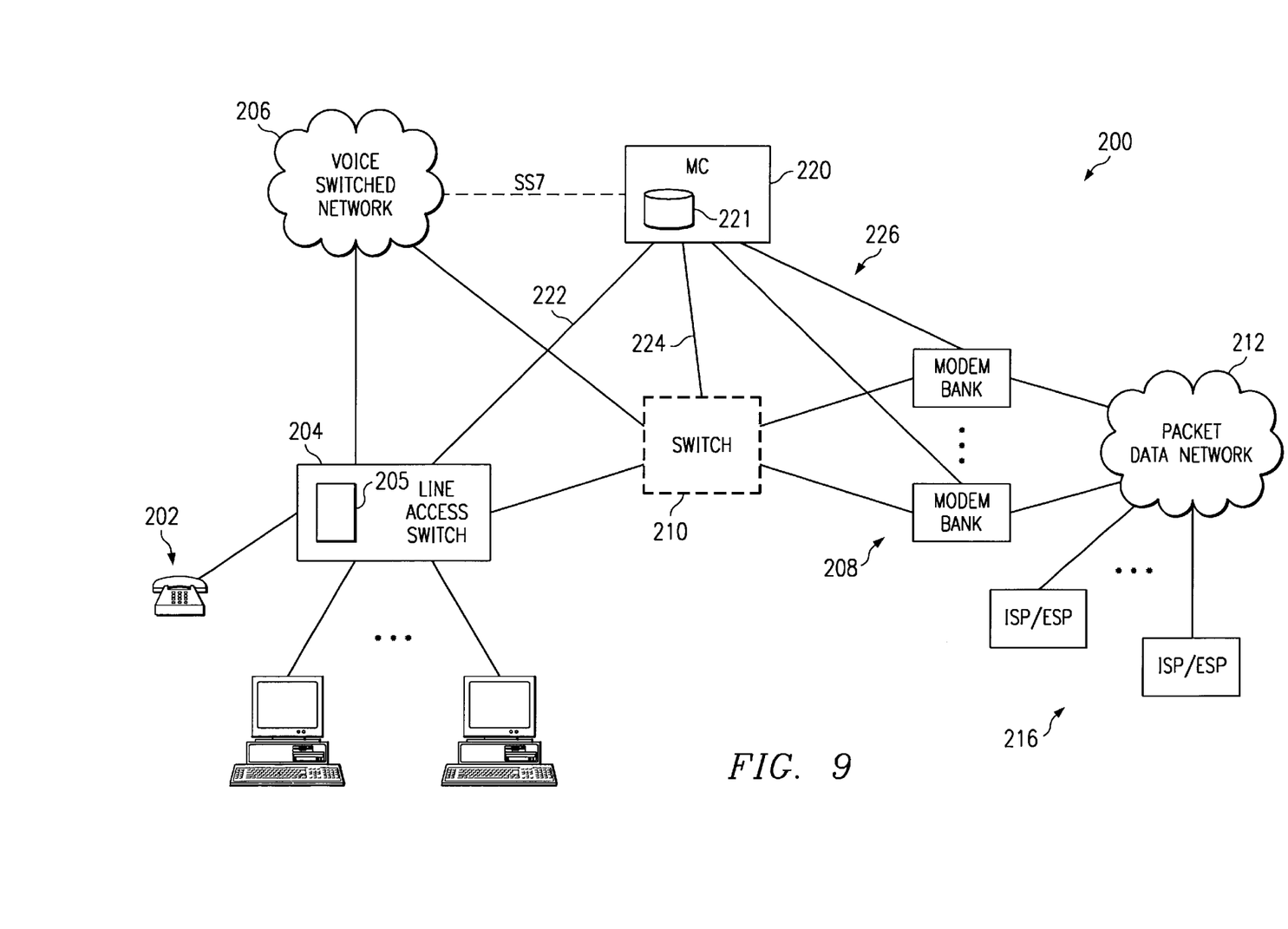
FIG. 9 is a block diagram of an Internet call line redirection system.
Figure 10:
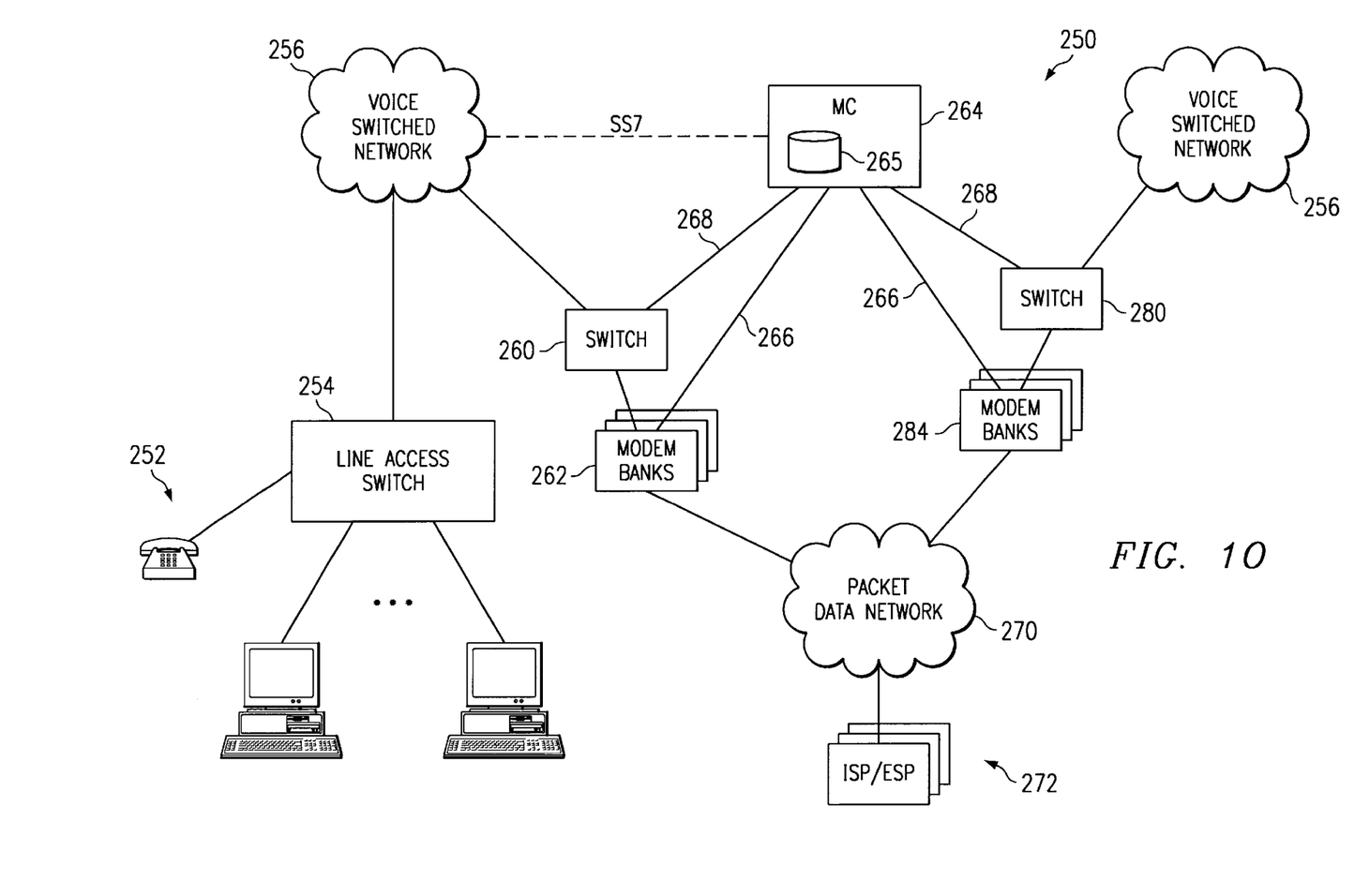
FIG. 10 is a block diagram of an Internet call trunk redirection system.
Figure 11:
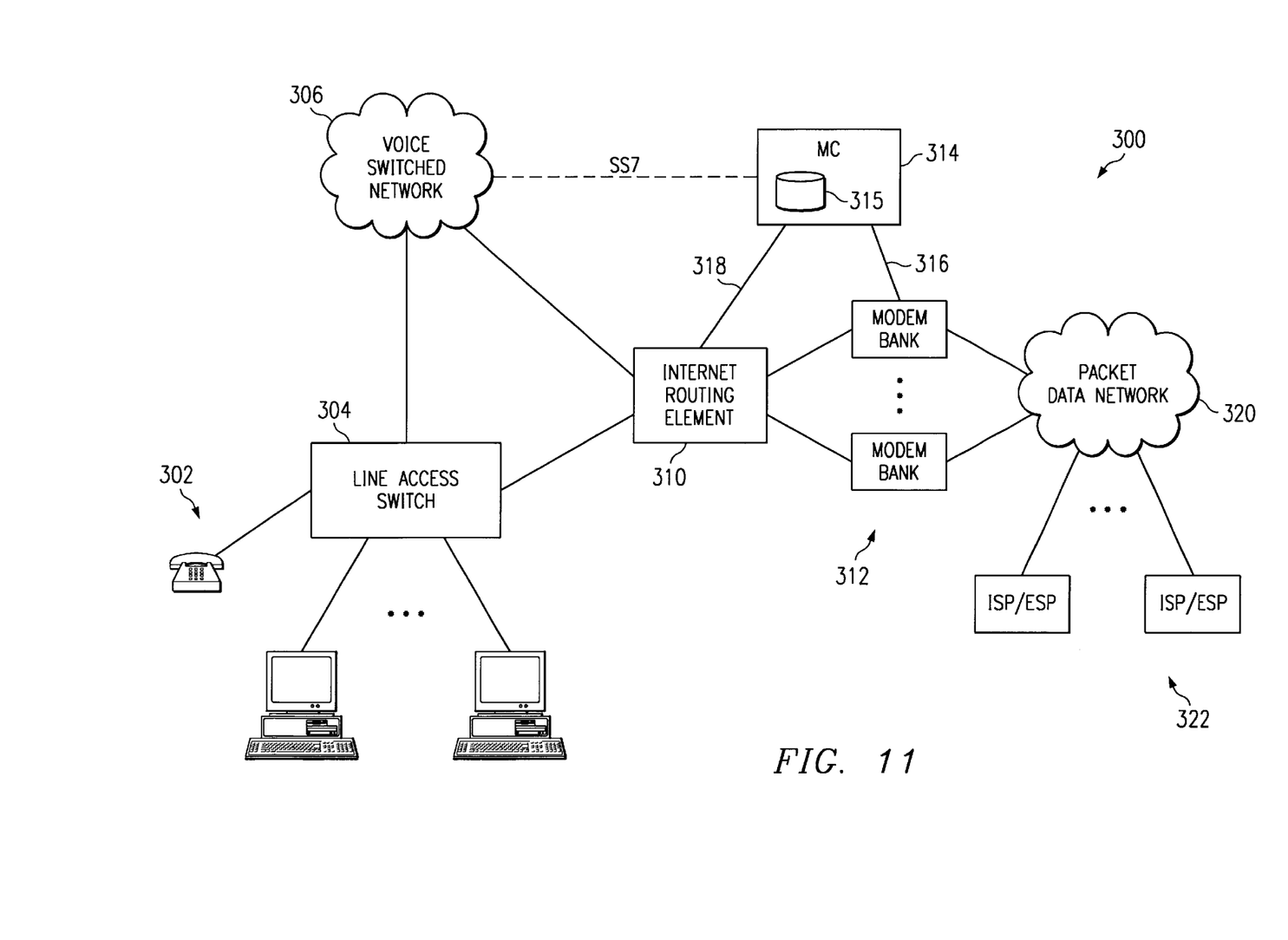
FIG. 11 is a block diagram of another Internet call trunk redirection system.

FIGS. 9–11 illustrate further embodiments of network configurations for routing Internet calls incorporating the teachings of the present invention. Referring to FIG. 9, a line redirecting configuration 200 more explicitly shown as employing external modem banks is provided. Local subscribers 202 are coupled to a line access switch or digital loop carrier 204 which is coupled to a voice switched network or public switched telephone network 206. Line access switch 204 may include internal modem banks 205 and/or is coupled to one or more modem banks 208 through an optional switch or cross-connect 210. Modem banks 208 are coupled to a packet data network 212, which is coupled to the Internet service providers and enhanced service providers 216. Packet data network 212 may be a frame relay network, an asynchronous transfer mode cell network, or any like data network. A master controller 220 is further coupled to line access switch 204 via a line access control link 222, to switch 210 via a switch control link 224, and to modem banks 208 via modem control links 226. Modem banks 208 may have an architecture shown in FIG. 6 and described in more detail above. Master controller 220 may be incorporated in a signal transfer point in the SS7 signaling network as described above. A subscriber information database 221 is incorporated in master controller 220 to determine whether a call may be line redirected or trunk redirected. The determination may be made based on whether the local subscriber originating the call is coupled to the end office switch through a line access switch or not. If the connection is through a line access switch, then line or trunk redirection may be performed; if the connection is not through a line access switch, then only trunk redirection may be performed. Line access control link 222 and switch control link 224 may follow X.25 protocol with proprietary data embedded therein. Modem control links 226 may follow the protocols described in Bellcore TR-1268 ISDN Primary Rate Interface Call Control Switching and Signaling Generic Requirements for Class II Equipment, ITU-T Recommendation Q.931 Digital Subscriber Signalling System No. 1 (DSS 1) — ISDN User-Network Interface Layer 3 Specification for Basic Call Control and ITU-T Recommendation Q.932 Digital Subscriber Signalling System No. 1 (DSS 1) — Generic Procedures for the Control of ISDN Supplementary Services. In addition, modem control links 226 include embedded proprietary data to be described in more detail below. All control links between master controller 220 and network components may include redundant links operating in backup mode or load sharing mode.

In operation, upon detecting that an incoming call originating from a local subscriber 140 is an Internet call, master controller 220 provides call processing control messages to line access switch 204 via line access control link 222. The Internet call is thus routed, under the direction of master controller 220, through optional switch 210 to a modem bank 208. The line access switch to end office switch connection is released and returns to idle. Switch 210 may provide DS0 channel grooming and cross-connecting, if needed. Modem bank 208 then processes the Internet call by converting it from an analog format to a digital format and subsequently into data packets for transport to Internet and enhanced service providers 216 by packet data network 212. The operations of line redirection is also described above in conjunction with FIG. 4B.

Referring to FIG. 10, an alternate embodiment 250 for Internet call trunk redirection is shown. Local subscribers 252 are coupled to a line access switch or digital loop carrier 254 which is coupled to a voice switched network or public switched telephone network 256. Line access switch 254 is coupled to a switch or cross-connect 260, which are coupled to one or more modem banks 262. Modem banks 262 are further coupled to a master controller 264 via a modem control link 266. Switch 260 is also coupled to master controller 264 via a switch control link 268. Modem banks connect switch 260 to a packet data network 270, which is coupled to Internet and enhanced service providers 272. Master controller 264 is further coupled to one or more additional distributed switches 280 with the attendant modem banks 284. A subscriber information database 265 is incorporated in master controller 264 to determine whether a call may be line redirected or trunk redirected. Again, modem banks 262 and 284 may have the architecture shown in FIG. 6 described in more detail above. Further, master controller 220 may be incorporated in a signal transfer point in the SS7 signaling network as described above. Similarly, all control links may include redundant links operating in a standby or load sharing mode.

In operation, a call identified as an Internet call is routed to switch 260 by the originating end office switch (not shown) in voice switched network 256. Under the control of master controller 267, switch 260 then passes the Internet call to modem bank 262 for conversion to digital and frame or cell format. The converted call is then routed through packet data network 270 to Internet or enhanced network providers 272. In this manner, a network of distributed switches 260 and 280 are provided as a frame relay or asynchronous transfer mode interface into packet data network 270. Details of the trunk redirect call set up process is described above in conjunction with FIG. 4B.

Referring to FIG. 11, another Internet call trunk redirection embodiment 300 is shown. Local subscribers 302 are coupled to a line access switch or digital loop carrier 304 which is coupled to a voice switched network or public switched telephone network 306. Line access switch 304 is coupled to one or more specialized Internet routing element 310, which is coupled to one or more modem banks 312.

Modem banks 312 may be coupled to a master controller 314 via a modem control link 3166. Internet routing element 314 may be coupled to an end office switch or a tandem switch in voice switched network 256. Internet routing element 310 is also coupled to master controller 314 via a control link 318. A subscriber information database 315 is incorporated in master controller 214 to determine whether a call may be line redirected or trunk redirected. Modem banks 312 connect Internet routing element 310 to a packet data network 320, which is coupled to Internet and enhanced service providers 322. Modem banks 312 may have the architecture shown in FIG. 6 described in more detail above. Further, master controller 314 may be incorporated in a signal transfer point in the SS7 signaling network as described above.

In operation, Internet routing element 310 functions as a data call hub under the direction of master controller 314 to provide the necessary interfaces to Internet and enhanced service providers 322. A trunk redirect Internet call may be redirected at the originating end office switch or at a tandem switch network in voice switched network 256. In both scenarios, master controller 314 provides control and routing information to Internet routing element 310 to direct the connection of the Internet call by Internet routing element 310. The Internet call is thus redirected through packet data network 270 to Internet or enhanced service provider 322.

Referring again to FIG. 9, it may be instructional to describe the call processing and signaling protocols among master controller 220 and the various network components. Traditionally, modem banks support the primary rate interface protocol. However, primary rate interface protocol lacks support of network management and maintenance resources when compared with the SS7 protocol. The master controller is designed to provide an interface between the modem banks and the telephony network through an enhanced primary rate interface protocol used in modem control link 226. Therefore, the master controller provides a call processing protocol conversion between ISUP on the line access switch and end office side and primary rate interface on the modem bank side. The master controller further controls the primary rate interface bearer channel assignment for each call to match the ISUP bearer channel. The modem control link between the master controller and modem bank follows Bellcore TR-1268 ISDN Primary Rate Interface Call Control Switching and Signaling Generic Requirements for Class II Equipment, ITU-T Recommendation Q.931 Digital Subscriber Signalling System No. 1 (DSS 1)—ISDN User-Network Interface Layer 3 Specification for Basic Call Control, and ITU-T Recommendation Q.932 Digital Subscriber Signalling System No. 1 (DSS 1) — Generic Procedures for the Control of ISDN Supplementary Services.

In particular, a facility message may be transmitted between master controller 220 and modem banks 208. The facility message may include two forms of information element (IE) shown in TABLE A and B below.

TABLE A

Message Type: Facility
Significance: Local
Direction: Both

| Information Element | Reference | Direction | Type | Length |
|---|---|---|---|---|
| Protocol discriminator | TR-1268 | both | M | 1 |
| Call Reference | TR-1268 | both | M | 2 |

TABLE A-continued

Message Type: Facility
Significance: Local
Direction: Both

| Information Element | Reference | Direction | Type | Length |
|---|---|---|---|---|
| Message Type | TR-1268 | both | M | 1 |
| Facility IE | 8.2.3/Q.932 | both | M | 8-* |

TABLE B

Message Type: Facility
Significance: Local
Direction: Both

| Information Element | Reference | Direction | Type | Length |
|---|---|---|---|---|
| Protocol discriminator | TR-1268 | both | M | 1 |
| Call Reference | TR-1268 | both | M | 2 |
| Message Type | TR-1268 | both | M | 1 |
| Extended Facility IE | 8.2.4/Q.932 | both | M | 8-* |

The format of the facility information element is shown below.

TABLE C

| 8 | 7 | 6 | 5 | 4 | 3 | 2 | 1 |
|---|---|---|---|---|---|---|---|
| 0 | 0 | 0 | 1 | 1 | 1 | 0 | 0 |
| | | | Length of facility contents | | | | |
| 1 ext | 0 | | | | | protocol profile | |
| | 0 (spare) | | | | | | |
| | | | Protocol Data Unit | | | | |

The facility information element may be used to indicate the invocation and operation of supplementary services, such as the line and trunk redirection contemplated by the teachings of the present invention. In particular, the protocol data unit (PDU) may be used to include embedded IP addresses and operation, maintenance and protection (OAM&P) information between the master controller and the modem banks in a proprietary manner.

The extended facility information element may be used when the protocol data unit has a length greater than 255 octets. The format therefor is set forth below.

TABLE D

| 8 | 7 | 6 | 5 | 4 | 3 | 2 | 1 |
|---|---|---|---|---|---|---|---|
| 0 | 0 | 0 | 0 | 1 | 1 | 0 | 1 |
| 0/1 | | | | Length of IE | | | |
| 1 | 0 | | | | | protocol profile | |
| | 0 (spare) | | | | | | |
| | | | Protocol Data Unit | | | | |

The same modem control link message format is applicable to all master controller to modem bank connection scenarios shown in FIGS. 9–11. However, it is also contemplated by the teachings of the present invention to allow a call routing element, such as a line access switch, a switch, or an Internet call routing element, to receive the modem control link messages and to pass them to the associated modem banks without extracting any information or acting on them.

It may be seen from the foregoing that a number of network components may serve as Internet call routing elements when one is capable of receiving and responding to control and OAM&P messages from the master controller and when one has access to a modem bank interface to the packet data network, either embedded internally or linked therewith externally. The call routing elements may be a line access switch for line redirection, or a switch and a dedicated Internet routing element for trunk redirection, as described above.

In summary, an Internet calls are routed away from the public switched telephone network in order to avoid congestion caused by the longer than average hold times of Internet calls. Internet calls are routed to an Internet data network that includes an Internet routing element and a line access switch. The Internet routing element and the line access switch employ ATM multiplexers that connect the Internet calls to a pool of modems and convert the digital data generated by the modems into ATM cells for transmission to Internet Service Providers over an ATM network. The ATM multiplexers work with a signal transfer point network and an SS7 network to generate the addressing information for the ATM cells.

Thus, it is apparent that there has been provided, in accordance with the present invention, a method and apparatus for routing Internet calls that satisfy the advantages set forth above.

Although the present invention has been described in detail, it should be understood that various changes, substitutions, and alterations can be made herein. For example, though the present invention has been described with reference to Internet calls, other types of calls with longer than average holding times may be routed in a similar manner. Other examples are readily ascertainable by one skilled in the art and may be made without departing from the spirit and scope of the present invention.

What is claimed is:

1. An Internet call routing system comprising:
    a master controller coupled to a signaling control network, the master controller operable to identify a call from a subscriber carried over a voice switched network as an Internet data call destined for an information service provider, the master controller operable to direct the Internet data call away from the voice switched network in response to an Internet data call volume usage associated with the subscriber;
    a call routing element operable to receive the Internet data call destined for the information service provider from the voice switched network as directed by the master controller; and
    at least one modem bank operable to convert the Internet data call destined for the information service provider from a first format to a second format as directed by the master controller, the modem bank operable to provide the converted Internet data call to a packet data network.

2. The Internet call routing system, as set forth in claim 1, wherein the call routing element is a line access switch coupled to a plurality of telephone service subscribers.

3. The Internet call routing system, as set forth in claim 1, wherein the call routing element is a switch coupled to an end office switch in the voice switched network.

4. The Internet call routing system, as set forth in claim 1, wherein the call routing element is a switch coupled to a tandem switch in the voice switched network.

5. The Internet call routing system, as set forth in claim 1, further comprising a control link transporting control and OAM&P information between the master controller and the modem banks.

6. The Internet call routing system, as set forth in claim 2, further comprising a control link transporting control and OAM&P information between the master controller and the line access switch.

7. The Internet call routing system, as set forth in claim 3, further comprising a control link transporting control and ONM&P information between the master controller and the end office switch.

8. The Internet call routing system, as set forth in claim 4, further comprising a control link transporting control and OAM&P information between the master controller and the tandem switch.

9. The Internet call routing system, as set forth in claim 1, wherein the at least one modem bank is embedded internally in the call routing element.

10. The Internet call routing system, as set forth in claim 1, wherein the at least one modem bank is located externally of the call routing element.

11. The Internet call routing system, as set forth in claim 2, further comprising a cross-connect coupled between the call routing element and the at least one modem bank.

12. A method for interfacing to a packet data network, comprising the steps of:
    identifying a call carried over a voice switched network as a data call destined for an information service provider;
    redirecting the data call away from the voice switched network in response to an Internet data call volume usage associated with the subscriber;
    receiving control information from a master controller;
    converting the data call from an analog format to a digital format;
    packing the call in digital format into a plurality of data packets;
    extracting a destination address from the control information;
    inserting the destination address into the plurality of data packets;
    sending the plurality of data packets to the information service provider via a packet data network.

13. The method, as set forth in claim 12, wherein the control information receiving step comprises the step of receiving the control information over a backplane.

14. The method, as set forth in claim 12, wherein the control information receiving step comprises the step of receiving the control information over a modem control link.

* * * * *